US008819781B2

(12) United States Patent
Kumar et al.

(10) Patent No.: US 8,819,781 B2
(45) Date of Patent: Aug. 26, 2014

(54) MANAGEMENT OF NETWORK DEVICES WITHIN A DISPERSED DATA STORAGE NETWORK

(75) Inventors: Sanjaya Kumar, South Elgin, IL (US); Steve Hoffman, Chicago, IL (US); Bart Cilfone, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 877 days.

(21) Appl. No.: 12/426,807

(22) Filed: Apr. 20, 2009

(65) Prior Publication Data

US 2010/0266131 A1    Oct. 21, 2010

(51) Int. Cl.
*G06F 7/04* (2006.01)
*G06F 17/30* (2006.01)
*H04L 9/32* (2006.01)
*H04L 29/08* (2006.01)
*H04L 29/06* (2006.01)

(52) U.S. Cl.
CPC ............ *H04L 9/321* (2013.01); *H04L 67/1061* (2013.01); *H04L 67/1002* (2013.01); *H04L 67/1097* (2013.01); *H04L 67/1095* (2013.01); *H04L 67/1042* (2013.01); *H04L 63/0823* (2013.01); *H04L 63/104* (2013.01); *H04L 9/3271* (2013.01)
USPC .................. 726/4; 726/29; 713/155; 713/191; 380/285

(58) Field of Classification Search
CPC ............ H04L 67/1097; H04L 67/1002; H04L 67/104; H04L 67/1095; H04L 67/1061; H04L 67/1063; H04L 67/1065; H04L 67/1068; H04L 67/107; H04L 67/1072; H04L 67/1042; H04L 41/0813; H04L 41/0836; H04L 41/0869; H04L 41/12; H04L 9/321; H04L 9/3271; H04L 63/104; H04L 63/0823; G06F 17/30215; G06F 17/30209; G06F 17/30203; G06F 3/067
USPC .................. 713/155, 191; 726/4, 29; 380/285
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |

(Continued)

OTHER PUBLICATIONS

Meira, Fernando. "A P2P Backup System for Small and Medium-sized Enterprises", 2007.*

(Continued)

*Primary Examiner* — Michael Simitoski
(74) *Attorney, Agent, or Firm* — Garlick & Markison; Timothy W. Markison

(57) ABSTRACT

A method of managing devices in a dispersed data storage network is disclosed. A device list is maintained including entries for every device in the dispersed data storage network. Each entry lists a public key, a network address, and hardware identifier for the corresponding device. On startup each device sends a request to join the network. The request includes the device's public key, network address, and hardware identifier. The request is compared with the device list, and, based on the comparison, and, in some cases, administrator action, the request is granted or denied.

14 Claims, 8 Drawing Sheets

(56) References Cited

U.S. PATENT DOCUMENTS

| | | | |
|---|---|---|---|
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,301,612 B1* | 10/2001 | Selitrennikoff et al. | 709/220 |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,973,473 B1* | 12/2005 | Novaes et al. | 709/201 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,536,693 B1* | 5/2009 | Manczak et al. | 718/105 |
| RE41,030 E* | 12/2009 | Pham et al. | 709/228 |
| 7,636,724 B2 | 12/2009 | de la Torre et al. | |
| 7,812,854 B1* | 10/2010 | Delker et al. | 348/14.01 |
| 7,849,213 B1* | 12/2010 | Borghetti | 709/238 |
| 7,904,475 B2* | 3/2011 | Gladwin et al. | 707/781 |
| 2001/0044879 A1* | 11/2001 | Moulton et al. | 711/114 |
| 2001/0049737 A1* | 12/2001 | Carolan et al. | 709/228 |
| 2002/0062422 A1 | 5/2002 | Butterworth et al. | |
| 2002/0166079 A1 | 11/2002 | Ulrich et al. | |
| 2003/0014511 A1* | 1/2003 | Maekawa et al. | 709/223 |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0120760 A1* | 6/2003 | Fortin et al. | 709/221 |
| 2003/0126059 A1* | 7/2003 | Hensley et al. | 705/36 |
| 2003/0145093 A1* | 7/2003 | Oren et al. | 709/229 |
| 2004/0024963 A1 | 2/2004 | Talagala et al. | |
| 2004/0106403 A1* | 6/2004 | Mori et al. | 455/426.2 |
| 2004/0122917 A1 | 6/2004 | Menon et al. | |
| 2004/0128587 A1* | 7/2004 | Kenchammana-Hosekote et al. | 714/43 |
| 2004/0215998 A1 | 10/2004 | Buxton et al. | |
| 2004/0228493 A1 | 11/2004 | Ma et al. | |
| 2005/0013368 A1* | 1/2005 | Gallant et al. | 375/240.16 |
| 2005/0100022 A1 | 5/2005 | Ramprashad | |
| 2005/0114594 A1 | 5/2005 | Corbett et al. | |
| 2005/0120025 A1* | 6/2005 | Rodriguez et al. | 707/10 |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0216813 A1* | 9/2005 | Cutts et al. | 714/752 |
| 2005/0229069 A1 | 10/2005 | Hassner | |
| 2005/0257055 A1* | 11/2005 | Anderson | 713/170 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0162674 A1* | 7/2007 | Leichsenring et al. | 710/241 |
| 2007/0174192 A1 | 7/2007 | Gladwin et al. | |
| 2007/0211691 A1* | 9/2007 | Barber et al. | 370/351 |
| 2007/0214285 A1 | 9/2007 | Au et al. | |
| 2007/0226224 A1* | 9/2007 | Wanigasekara-Mohotti et al. | 707/10 |
| 2007/0234110 A1 | 10/2007 | Soran et al. | |
| 2007/0283167 A1 | 12/2007 | Venters, III et al. | |
| 2008/0004017 A1* | 1/2008 | Shimizu | 455/435.1 |
| 2008/0005199 A1* | 1/2008 | Chen et al. | 707/204 |
| 2008/0134309 A1* | 6/2008 | Qin et al. | 726/6 |
| 2008/0147821 A1* | 6/2008 | Dietrich et al. | 709/216 |
| 2008/0301779 A1* | 12/2008 | Garg et al. | 726/4 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rhea, Sean, et al. "Maintenance-free global data storage." Internet Computing, IEEE 5.5 (2001): 40-49.*

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

450

500

600

700

MANAGEMENT OF NETWORK DEVICES WITHIN A DISPERSED DATA STORAGE NETWORK

CROSS-REFERENCE TO RELATED APPLICATIONS

None

FIELD OF THE INVENTION

The present invention relates generally to systems, apparatus, and methods for managing devices within a network, and more particularly to systems, methods, and apparatus for managing devices within a dispersed data storage network, and more particularly still to systems, methods, and apparatus for automatically determining when device additions, device removals, device hardware modifications, device software modifications, and other changes are made to a dispersed data storage network.

DESCRIPTION OF THE PRIOR ART

Dispersed data storage systems provide storage by utilizing an information dispersal algorithm to slice data into a plurality of data slices, each of which is stored using a separate storage node. When data needs to be read from the dispersed data storage system, the data slices are read from the storage nodes, and the original data is reassembled. Schemes for implementing dispersed data storage systems, such as dispersed data storage networks ("DDSNs"), are known in the art. For example, U.S. Pat. No. 5,485,474 Rabin, describes a system for splitting a segment of digital information into n data slices, each of which is stored in a separate device. When the stored data segment must be retrieved, only m of the original data slices must be read to reconstruct the data segment, where n>m.

Dispersed data storage systems may be implemented as a network, and, when so implemented, will generally be comprised of a plurality of computer systems networked together. Like other networks, the computers comprising a dispersed data storage network are subject to hardware failures, software issues, upgrades, removal, and other modifications. As dispersed data storage networks may be comprise hundreds of machines, and may be implemented so as to span multiple continents, administration workload is of considerable concern. Present dispersed data storage networks require administrators to coordinate changes among themselves to insure proper operation of the network. For example, when a device is added to a dispersed data storage network, the administrators must manually publish the device to users, by, for example, updating a device directory referred to by user's software.

OBJECTS OF THE INVENTION

Accordingly, it is an object of this invention to provide a system apparatus, and method for automatically managing devices within a dispersed data storage network.

Another object of this invention is to provide a system, apparatus, and method for automatically detecting the addition of a device into a dispersed data storage network.

Another object of the invention is to provide a system, apparatus, and method for automatically detecting the modification of a device operating within a dispersed data storage network.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a method for adding a device to a dispersed data storage network. The method comprises the steps of receiving a device approval request from a device not part of the dispersed data storage network. The device approval request includes a public key, a network address, and a hardware identifier. The device approval request is compared with a device list that includes one entry for every device in the dispersed data storage network. If no entry is located in the device list that matches the public key, network address, or hardware identifier identified in the approval request, a new entry is created based on the public key, network address, and hardware identifier included in the approval request, and added to the device list.

In a further embodiment, a manager computer comprises a network port adapted to receive a device approval request, a storage device for storing a device list, and a processor coupled to the network port and storage device. The processor compares the device approval request with the device list, and, if a matching entry is not found, creates a new entry based on the device approval request, and adds it to the device list.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
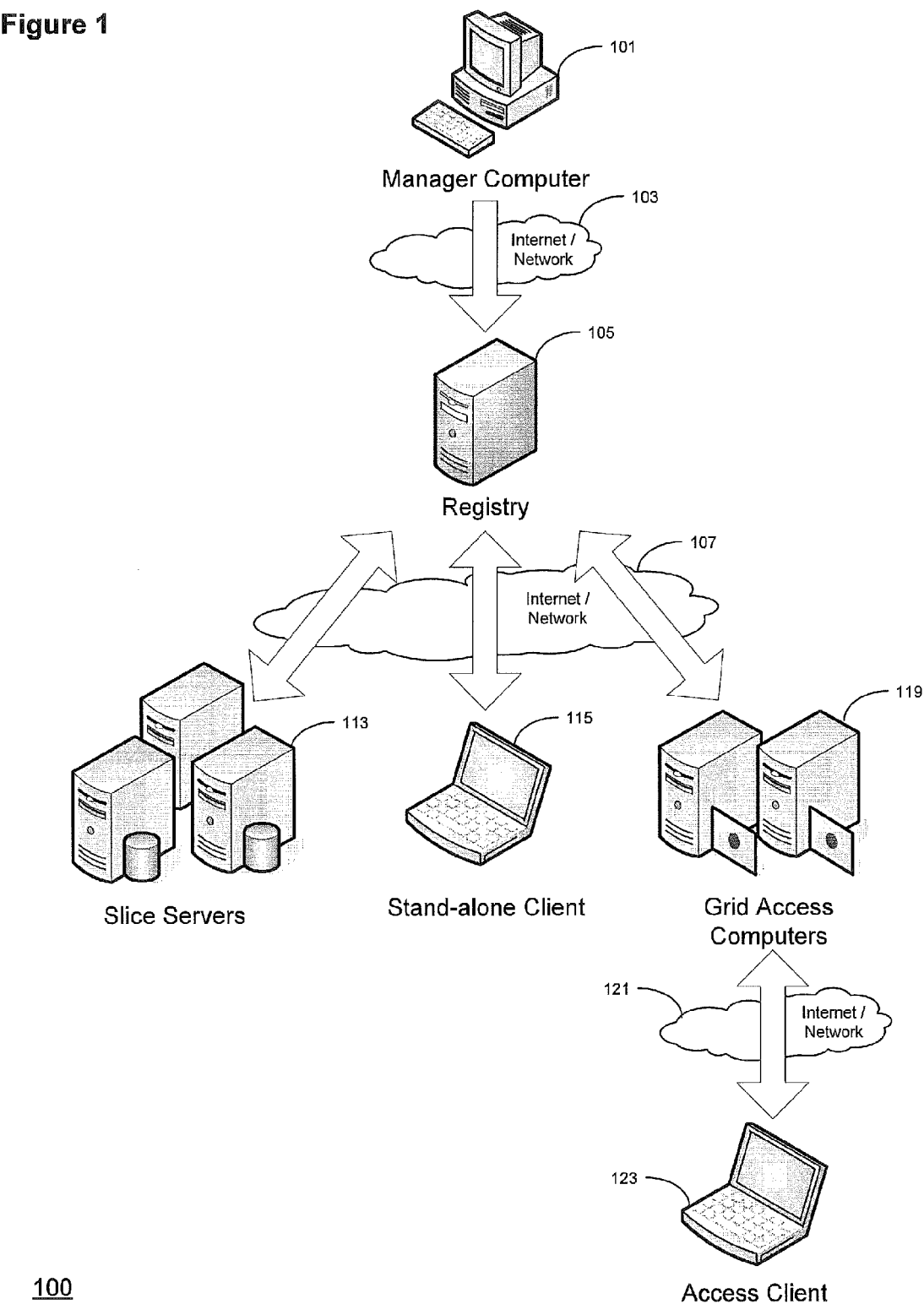
FIG. 1 is a system diagram of a dispersed data storage network implementing the disclosed device management system.

Referring to the figures and to FIG. 1 in particular, a representative block diagram of a dispersed data storage network utilizing the disclosed device management system is depicted. A manager computer 101 interfaces with a registry computer 105. The registry computer 105 provides information about related devices as well as vault information to a plurality of slice servers 113 as well as one or more grid access computers 119 and any stand-alone clients 115. Networks 103, 107, and 121 allow different components of the dispersed data storage network to communicate. These networks can be of any suitable, high-speed type, such as, for example, the Internet, a LAN, or a WAN. Access client 123 accesses the dispersed data storage network through grid access computers 119.

The registry computer 105, the operation of which is more fully described in U.S. patent application Ser. No. 61/141,494, titled Systems, Methods & Apparatus for Identifying Accessible Dispersed Digital Storage Vaults Utilizing a Centralized Registry, provides information about the dispersed data storage network's topography to other components, such as slice servers 113, stand-alone clients 115, and grid access computers 119.

Access Client 123 issues requests to read and write data segments from the dispersed data storage network to grid access computers 119.

Grid access computers 119 accept requests to read and write data segments from access clients 123. When a read request is received, grid access computers 119 issue data slice read requests to appropriate slice servers 113, read a threshold m number of constituent data slices, and reassemble the requested data segment using a reverse information dispersal algorithm; note that m varies based on the particular dispersed data storage network. The data segment is then returned to the requesting access client 123. When a request to write a data segment is received, grid access computers 119 apply an information dispersal algorithm to the data segment to generate n data slices, where n varies based on the dispersed data storage network. The data slices are then written to appropriate slice servers 113.

Grid access computers 119 also maintain account information for individual users (as opposed to client computer) using a construct referred to herein as a vault. A vault associates client accounts with slice servers 113 and various grid access devices, such as grid access computers 119 and stand-alone clients 115. Vaults and their operation are more fully defined in U.S. applicant Ser. No. 11/973,621 and titled Virtualized Data Storage Vaults on a Dispersed Data Storage Network.

Stand-alone clients 115 are client computers capable of directly accessing slice servers 113, and, accordingly, combine the functions of access clients 123 and grid access computers 119.

It should be noted that persons of skill in the art will realize that the disclosed network topography is not a limitation of the disclosed invention, which could be used with a variety of networks, including other dispersed data storage network topographies, or networks other than dispersed data storage networks.

The disclosed device management system utilizes descriptive information about each device within a network to determine if a change to the device has occurred, or if the device is a new addition to the network. The disclosed device management system is largely automated, although some user interaction may optionally be required to approve a new device, or a device change; nonetheless, the workload of network administrators is greatly reduced by the operation of the disclosed device management system.

Figure 2:
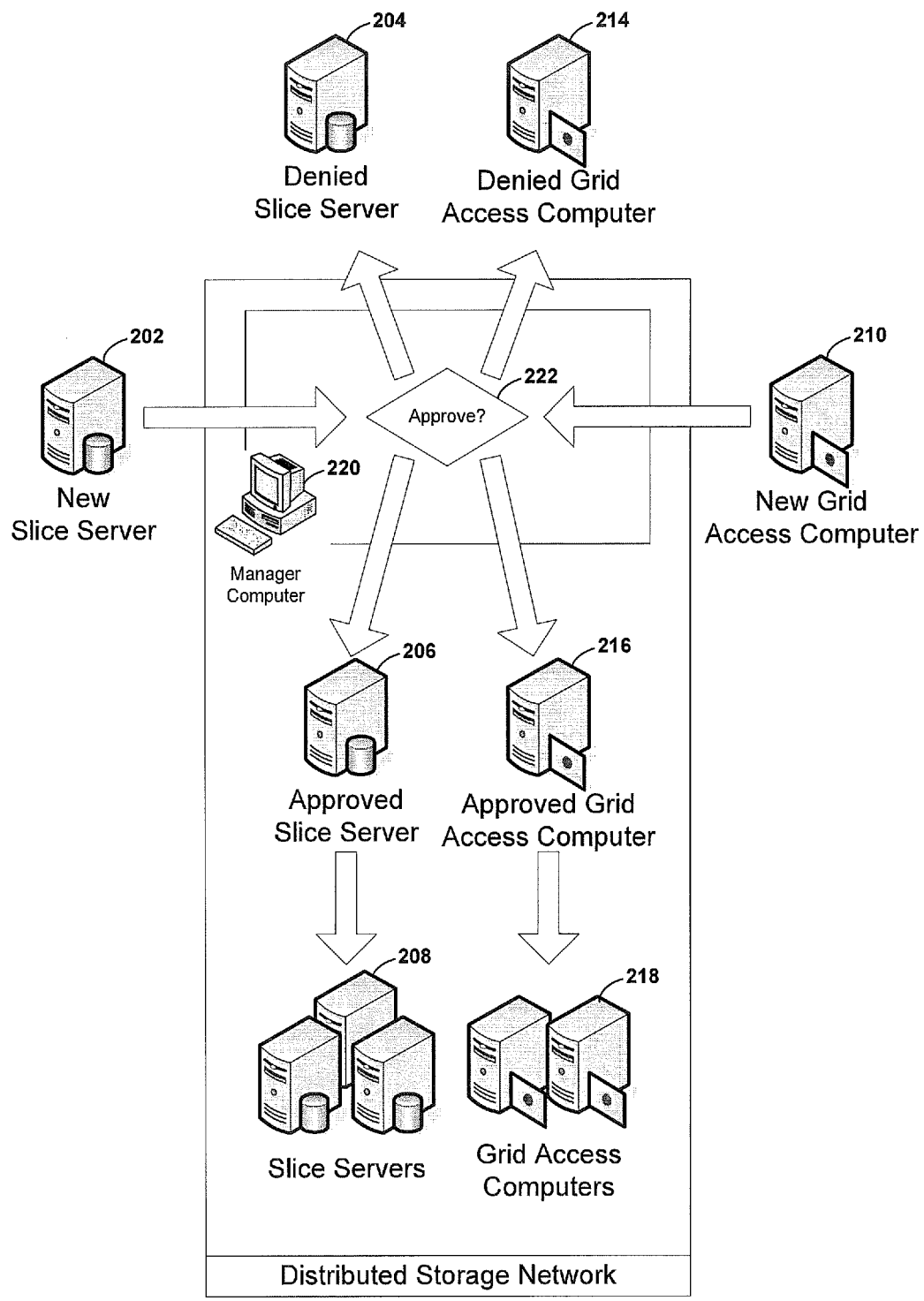
FIG. 2 is a network diagram illustrating the process by which a device is approved into a dispersed data storage network implementing the disclosed device management system.

FIG. 2 illustrates the process of adding a device to a dispersed data storage network in accordance with the disclosed device management system. As discussed more fully herein, a manager computer 220 maintains a collection of device entries, each of which describe a device in the network. At some point, an administrator installs a new slice server 202 and a new grid access computer 210. The manager computer 220 will then determine that the installed devices are in fact new devices, and not modifications of existing devices, and will give the administrator an option to approve the devices or not. If the devices are not approved into the network, they will be flagged as a denied slice server 204, and a denied grid access computer 214, and will not participate in the network. However, if the administrator does approve the devices, they will be allowed to join the network as an approved slice server 206 and an approved grid access computer 216, and will be accessible with the other slice servers 208 and grid access computers 218.

As part of the disclosed device management system, the manager computer must determine if a device is a new addition to the network, or a hardware/software modification of an existing device. The manager makes this determination by examining three pieces of data, each of which is, under normal circumstances, unique to a particular device within a network. These datapoints are: (1) a device's network address, (2) a device's hardware identifier, and (3) a public encryption key that is unique to a particular device. A network address is an address by which a device is uniquely known within a network. Examples are an Internet protocol version 4 address or an Internet protocol version 6 address. A device's hardware identifier is an identifier that is unique to a particular computer or network device, and is accessible to the device itself. Examples of a suitable hardware identifier are a media access control address ("MAC address"), an Ethernet hardware address, a hardware address, an adapter address, a physical address, a processor identifier, or, where multiple such identifiers exist within a single computer or device, a collection of any of the above. A public encryption key is a numeric key suitable for use with a public-key encryption scheme. Examples of suitable public keys include an RSA public key, a Cramer-Shoup public key, a Paillier public key, an ElGamal public key, a PGP public key, a GPG public key, or any other secure public encryption key.

The manager computer maintains a collection and/or database of every device approved to comprise the dispersed data storage network. This collection and/or database is referred to herein as the device list. In one embodiment of the device list, a separate entry or record is maintained for every device approved to comprise the dispersed data storage network, and each entry will contain, among other information, the three datapoints described above.

Figure 3:
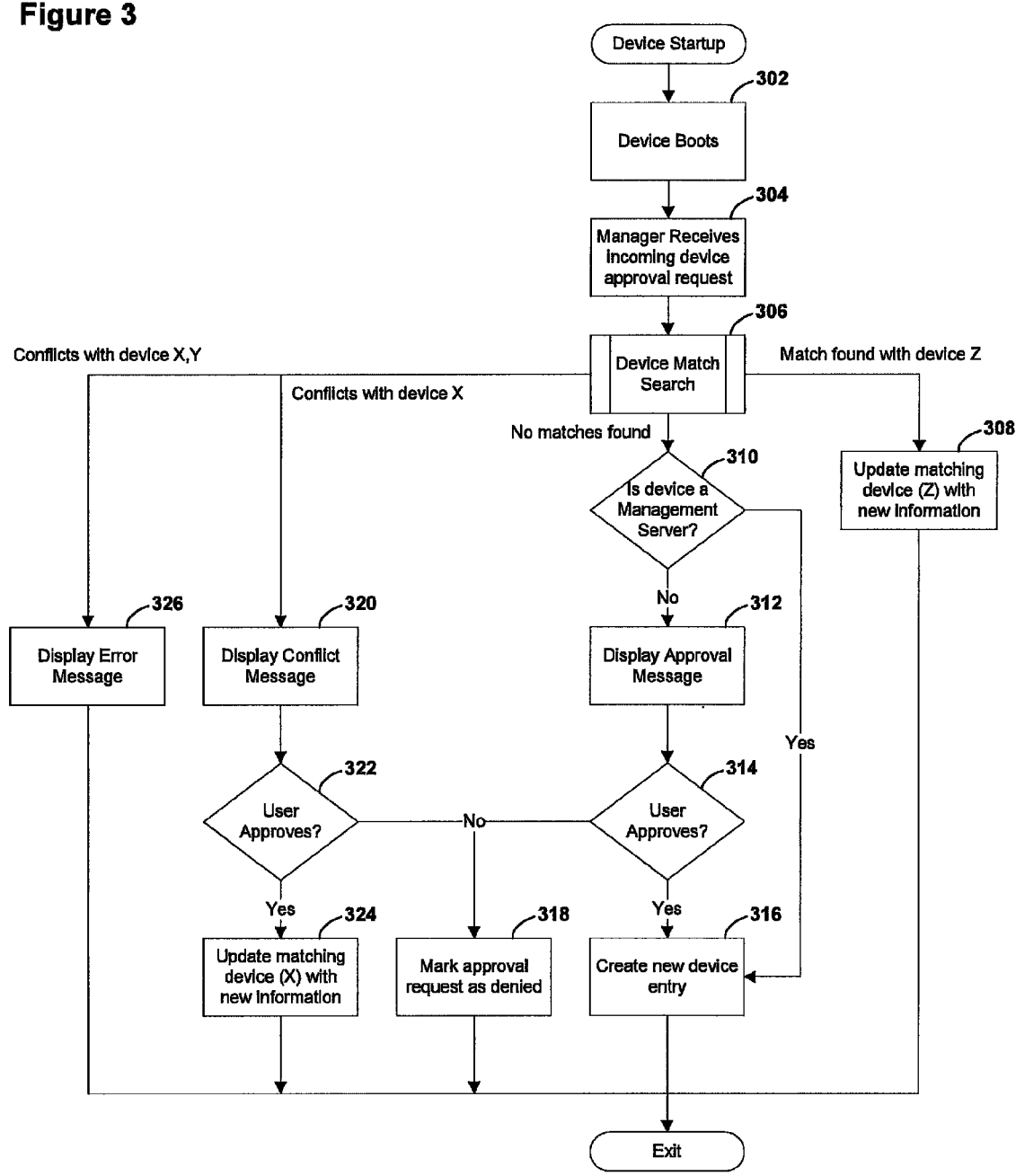
FIG. 3 is a high level flow chart illustrating a method for managing the addition of a new device to a dispersed data storage network, or the modification of an existing device operating on a dispersed data storage network, in accordance with the disclosed device management system.

FIG. 3 depicts a high level flowchart of a method for managing the addition of a new device to a network, as well as the modification of existing devices. This method, which can be implemented as a software program, routine, or procedure, runs, in one embodiment, on a network device as well as the management computer. Alternatively, the part of the method executed by the management computer can be executed by any other computer within the dispersed data storage network, such as, for example, the registry computer, or a grid access computer.

Generally, the disclosed method functions by comparing the datapoints obtained from a device seeking approval to join the dispersed data storage network with the device entries in the device list. The disclosed method attempts to account for common actions taken by administrators. For example, if the hard drive of a device fails, it is likely that the public key of the device will be deleted, but, when repaired, it will have the same hardware identifier and network address. As another example, when a new device is installed, none of its datapoints should match any device entry. However, the most likely cause of error would be that it was installed with the network address of another device. If so, the disclosed method will catch the error.

In step 302, a network device boots, or begins its initialization sequence. During initialization the network device sends a message to the manager computer requesting approval to join the dispersed data storage network. This request will include the three identifiers described above; namely, the device's network address, the device's hardware identifier, and the device's public key. In step 304, the manager receives this request and, in step 306, calls a device match search procedure. The three identifiers may be passed to the procedure as arguments and/or parameters, or the three identifiers may be accessible to the procedure in some other way. The operation of the device match search procedure is described in FIGS. 4 and 4a.

The device match search procedure can indicate several different circumstances. In some cases, a positive match may be found between the requesting device and a device entry contained within the device list, and, if so, execution will transition to step 308, where the manager will update the device entry corresponding to the requesting device with any new information contained in the request. After updating the appropriate device entry, the method will terminate.

Another possible outcome of the device match search procedure would be that no match was found. If no match is found, execution will transition to step 310, where a determination will be made as to whether the requesting device is a management server. If the device is a management server, execution transitions to step 316, where a new device entry is created and inserted into the device list, after which the method terminates. However, if the device is not a management server, an approval message is displayed to an administrator in step 312. It should be noted that the approval message may be displayed in a variety of ways, none of which are a limitation of the disclosed device management system. For example, the approval message may be displayed on an LCD display coupled to the manager computer, via a remote application to the administrator's workstation, via a remote application to the administrator's wireless mobile phone, via a phone call or text message to the user's phone, or any other suitable way.

In step 314 the administrator is given the option of approving the addition of the device to the dispersed data storage network. It should be noted that the form of this approval is not a limitation of the invention, and any suitable mechanism may be used. Suitable approval mechanisms include selecting "OK" from a pop-up box display by the management computer, making a similar selection from the administrator's own remote computer, making a selection using an application on the administrator's phone, or by responding to a phone call or text message with one or more key strokes. If the administrator approves the new device, execution transitions to step 316 where a new device entry is created and inserted into the device list, and the method terminates. However, if the user does not approve the new device, a device entry is created and marked as denied; denied device entries may be maintained as part of the device list, or may be maintained separately from the device list.

Another possible outcome of the device match search procedure is that a conflict between the requesting device and a single other device X can be discovered. In this case, a conflict message is displayed in step 320. The conflict message may display information about the requesting device, as well as information about the apparent conflict, so as to give the administrator sufficient information to determine if the requesting device is in fact device X. This message may be displayed in any way as described above, and the method of display is not a limitation of the disclosed device management system. In step 322, the administrator is given the opportunity to approve the requesting device, and, if the approval is allowed, the device entry corresponding to device X is updated with the requesting device's information, and the method terminated. However, if the device is not approved, execution transitions to step 318, where a device entry will be created and marked as denied, as described above.

A final possible outcome of the device match search procedure is that a conflict between the requesting device and multiple other devices can be discovered. In this case, an error message is displayed to the administrator in step 326, and the method terminates. As with other displayed messages, the method of display of this message is not a limitation of the disclosed device management system.

Figure 4:
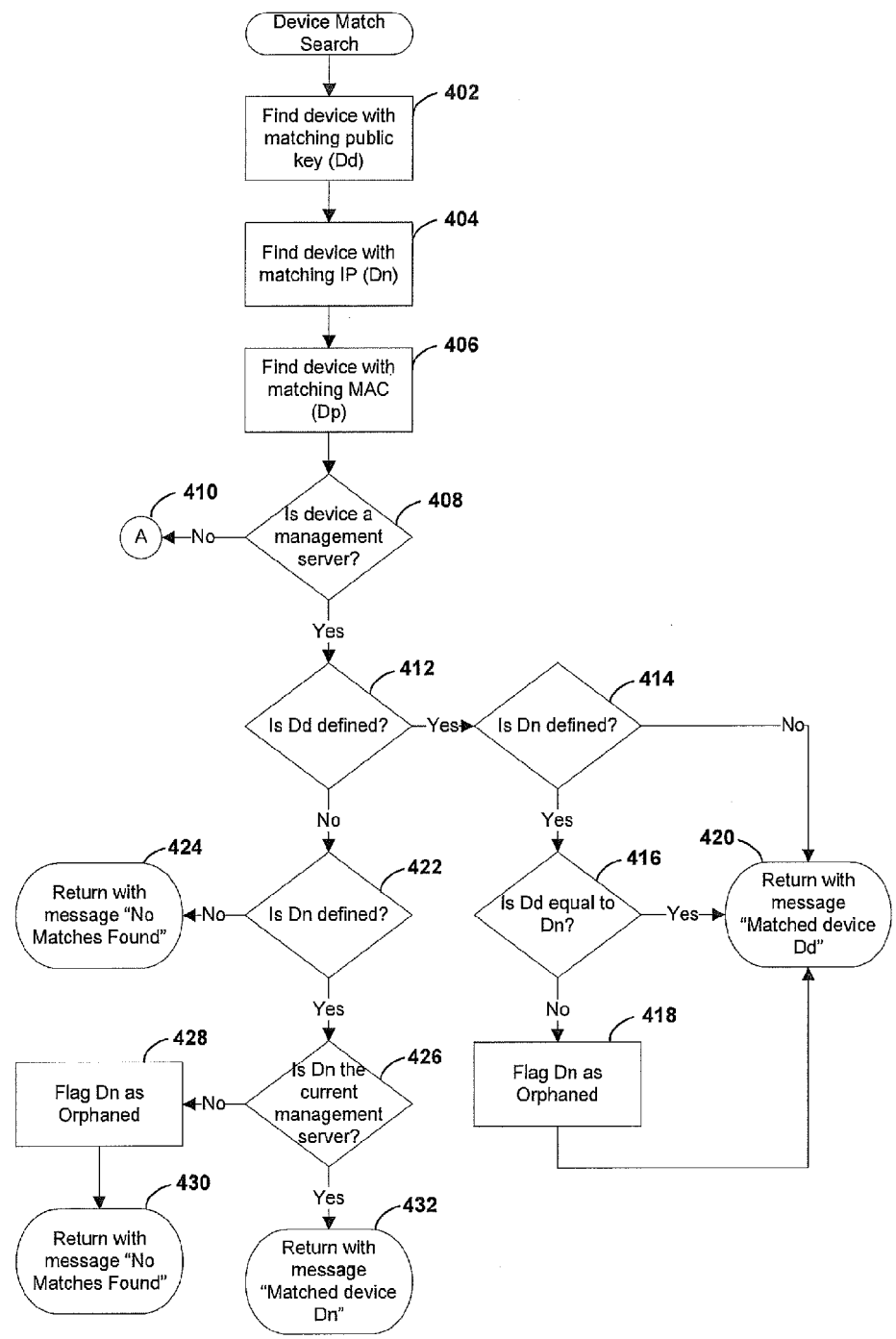
FIG. 4 is a flow chart illustrating an method for detecting whether a device matches the characteristics of any other device operating on a dispersed data storage network.

FIG. 4 depicts an implementation of the device match search procedure, which comprises a part of the disclosed device management method, system and apparatus. This procedure accesses the three data points of the device requesting to join the dispersed data storage network, as described in FIG. 3 and the above text. The three data points are the requesting device's public key, the requesting device's network address, and the requesting device's hardware identifier.

In steps 402, 404, and 406, the device list is walked and searched for any entry matching the public key, network address, or hardware identifier of the requesting device. Any matching entries are noted, and, if a device with a matching public key is found, variable Dd will be set to the matching entry; if a device with a matching network address is found, variable Dn will be set to the matching entry, and if a device with a matching hardware identifier is found, variable Dp will be set to the matching entry. Execution then transitions to step 408, where a determination is made as to whether the requesting device is a device management server. If the requesting device is not a device management server, execution transitions to the steps outlined in FIG. 4a. However, if the requesting device is a management server, execution transitions to step 412.

In step 412, a determination is made as to whether a device with a matching public key was found. If so, execution transitions to step 414, where a determination is made as to whether a device with a matching network address has been located. If so, in step 416 a determination is made as to whether the device with the matching public key is the same as the device with the matching network address. If so, the entry corresponding to the matching device is returned in step 420. However, if not, the device entry with a matching network address is marked as orphaned in step 418, and the device entry with the matching public key will be returned in step 420.

When executing step 412, if it is determined that there is no device with a matching public key, execution transitions to step 422, where a determination is made as to whether a device with a matching network address exists. If no such device exists, the procedure returns an indication that no matching device was found in step 424. However, if a device with a matching network address is located, a determination is made in step 426 as to whether the matching device is in fact the current management server. If so, the matching device entry is returned in step 432. However, if the matching device is not the current management server, the matching device entry is flagged as orphaned in step 428 and an indication that no matches were found is returned in step 430.

Figure 4A:
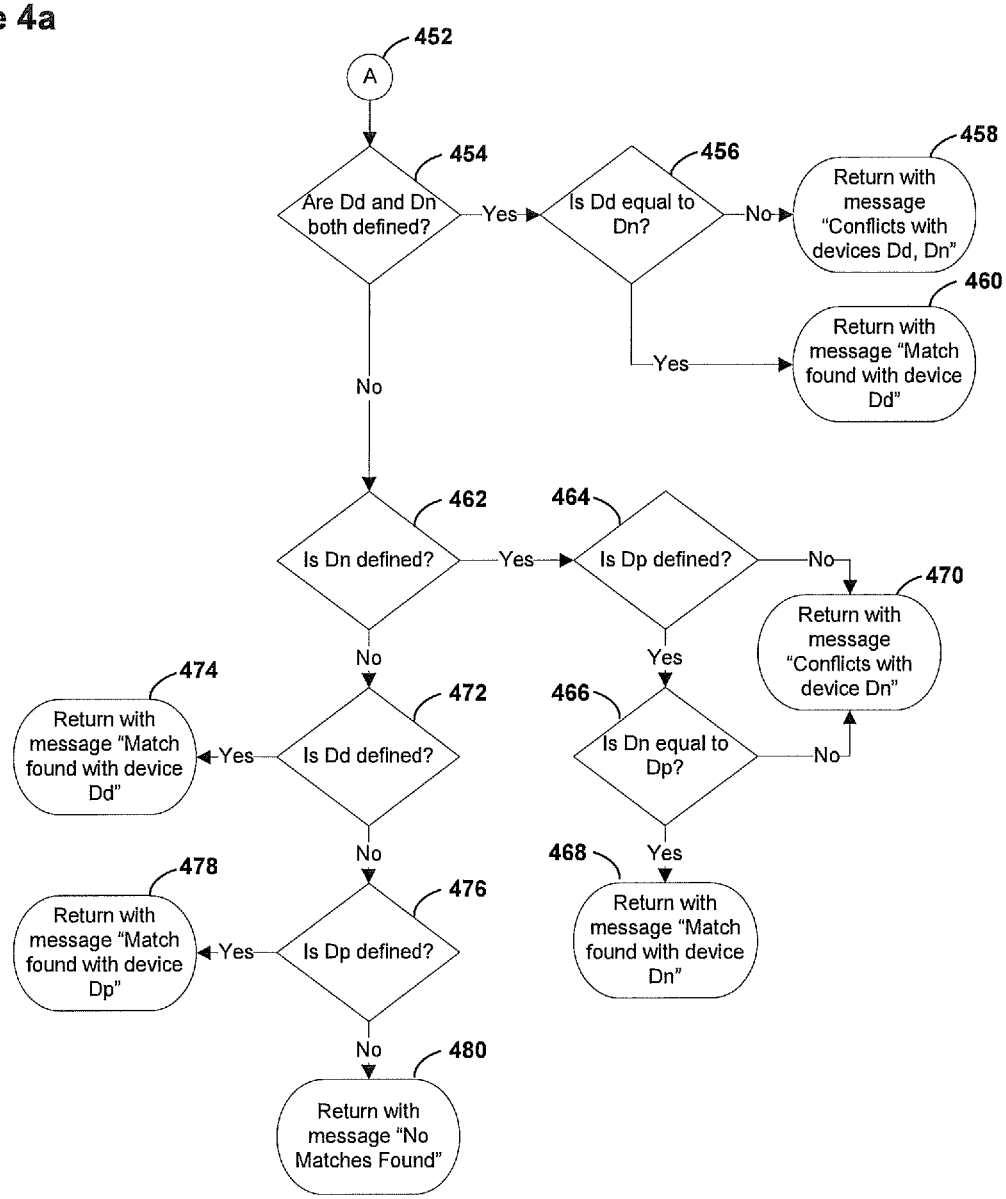
FIG. 4a is a continuation of the flow chart of FIG. 4.

When executing step 408, if it is determined that the requesting device is not a management server, execution transitions to FIG. 4a. In step 454, a determination is made as to whether device entries matching the public key and network address of the requesting device were located. If so, in step 456, a determination is made as to whether the device entry matching the public key of the requesting device is the same as the device entry matching the network address of the requesting device. If so, the device entry matching both the requesting device's public key and network address is returned in step 458. However, if the device entry matching the requesting device's public key is not the same as the device entry matching the requesting device's network address, an indication that multiple devices have been matched is returned in step 458.

When executing step 454, it is determined that both a device matching the public key of the requesting device and the network address of the requesting device have not been found, execution transitions to step 462, where a determination as to whether at least a device entry matching the requesting device's network address was located. If such a device entry was located, execution transitions to step 464, where a determination is made as to whether a device entry having the same hardware identifier as the requesting device was located. If not, a conflict message is returned in step 470, indicating that the requesting device conflicts with the device corresponding with the device entry matching the requesting device's network address. However, if a device entry is found that matches the requesting device's hardware identifier, a determination is made in step 466 as to whether the device entry matching the requesting device's network address is the same as the device entry matching the requesting device's hardware identifier. If not, a conflict message is returned in step 470, indicating that the requesting device conflicts with the device corresponding with the device entry matching the requesting device's network address. However, if the determination made in step 466 is that the device entry matching the requesting device's network address is the same as the device entry matching the requesting device's hardware identifier, execution transitions to step 468, where the matching device entry is returned.

Returning to step 462, if it is determined that there is no device entry with a network address matching the network address of the requesting device, execution transitions to step 472, where a determination is made as to whether a device entry with the same public key as the requesting device was located. If such a device entry was located, it is returned in step 474. However, if no device entry with the same public key as the requesting device was located, execution transitions to step 476, where a determination is made as to whether a device entry with the same hardware identifier as the requesting device was located. If so, execution transitions to step 478, where the matching device entry is returned. However, if no matching device entry is found, execution transitions to step 480, where an indication that no matching device entries were found is returned.

Figure 5:
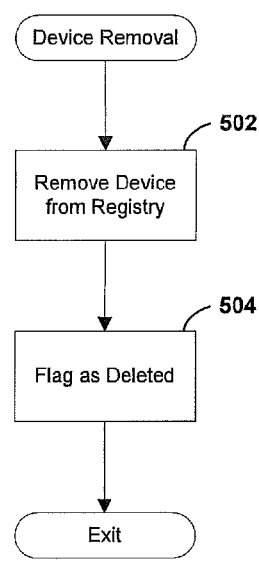
FIG. 5 is a flow chart illustrating a method for removing a device from a dispersed data storage network.

FIG. 5 is a flowchart illustrating a method for removing a device from a dispersed data storage network in accordance with the disclosed device management system. This method may be manually executed by an administrator using an appropriate software tool, or it may be automated to run as a software program, procedure, function, or other form of routine on a computer. In its automated form the method may execute on the management computer, or alternatively, on any other computer within the dispersed data storage network, such as, for example, the registry computer or a grid access computer. In step 502, a device is removed from the registry, and in step 504, the device list entry corresponding to the device to be removed is flagged as deleted.

Figure 6:
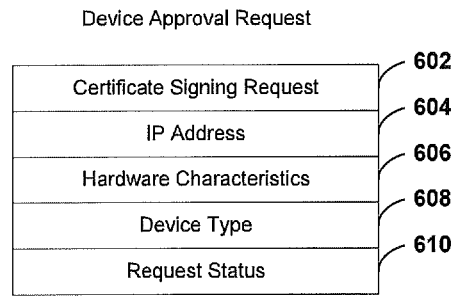
FIG. 6 is a data structure embodying a device approval request.

FIG. 6 depicts a device approval request. The request comprises a certificate signing request 602, the device's network address 604, the hardware characteristics 606 of the device, the device type 608, and the request status 610. The certificate signing request 602 is the device's public key. The hardware characteristics 606 of the device include the base hardware type, processor type, number of drives, amount of total storage, amount of memory, and the device's hardware identifier. The device type 608 field indicates if the device is purposed as a slice server, a grid access computer, a manager, or a registry computer.

Figure 7:
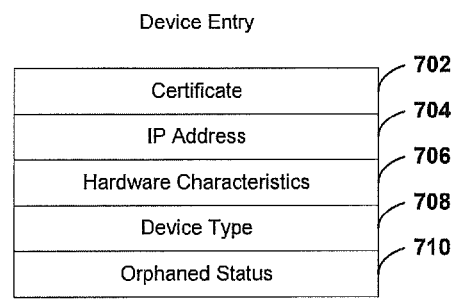
FIG. 7 is a data structure embodying a device entry.

FIG. 7 depicts a device entry as maintained by the device list. A device entry comprises a certificate 702, a network address 704, hardware characteristics 706, the device type 708, and whether or not the device has been orphaned 710. A device will be marked as orphaned if, while executing the disclosed device management method, a conflict that cannot be accounted for is discovered between the device entry and a device seeking approval to join the dispersed data storage network.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of managing devices in a dispersed data storage network, the method comprises:
   receiving a device approval request from a slice server;
   determining whether the device approval request is to add the slice server to a dispersed data storage network (DDSN) or is to update the slice server in a device list based on replacement of a failed hard drive;
   when the device approval request is to add the slice server to the DDSN:
      initiating an approval process regarding the slice server;
      when the slice server is approved, updating the device list to include the slice server, wherein the slice server is one of a set of slice servers that stores data slices of an encoded data segment, wherein "m" of "n" of the stored data slices are needed to reconstruct a data segment; and
   when the device approval request to update the slice server in the device list based on replacement of a failed hard drive, updating the device list.

2. The method of claim 1, wherein the device approval request comprises:
   a public key, a network address, and a hardware identifier.

3. The method of claim 1, wherein the determining whether the device approval request is to add the slice server comprises:
   determining that there are no matches of a network address of the device approval request in the device list.

4. The method of claim 1, wherein the determining whether the device approval request is to add the slice server comprises:
   determining that there are no matches of a hardware identifier of the device approval request in the device list.

5. The method of claim 1 further comprises:
   determining that the device approval request is to update the slice server in the device list based on update of hardware characteristics of the slice server, wherein the hardware characteristics includes one or more of number of hard drives, amount of total storage, and amount of memory.

6. A managing device of a data dispersed storage network comprises:
a network port operable to receive a device approval request via a network from a slice server;
memory for storing a device list; and
a processor operable to:
   determine whether the device approval request is to add the slice server to a dispersed data storage network (DDSN) or is to update the slice server in a device list based on replacement of a failed hard drive;
   when the device approval request is to add the slice server to the DDSN:
      initiate an approval process regarding the slice server;
      when the slice server is approved, update the device list to include the slice server, wherein the slice server is one of a set of slice servers that stores data slices of an encoded data segment, wherein "m" of "n" of the stored data slices are needed to reconstruct a data segment; and
   when the device approval request to update the slice server in the device list based on replacement of a failed hard drive, update the device list.

7. The managing device of claim 6, wherein the device approval request comprises:
a public key, a network address, and a hardware identifier.

8. The managing device of claim 6, wherein the processor is further operable to determine whether device approval request is to add the slice server by:
determining that there are no matches of a network address of the device approval request in the device list.

9. The managing device of claim 6, wherein the processor is further operable to determine whether the device approval request is to add the slice server by:
determining that there are no matches of a hardware identifier of the device approval request in the device list.

10. The managing device of claim 6, wherein the processor is further operable to:
determine that the device approval request is to update the slice server in the device list based on update of hardware characteristics of the slice server, wherein the hardware characteristics includes one or more of number of hard drives, amount of total storage, and amount of memory.

11. A storage device comprises:
a first section for storing a software routine that, when executing by a computer, causes the computer to determine whether the device approval request is to add the slice server to a dispersed data storage network (DDSN);
a second section for storing a software routine that, when executing by the computer, causes the computer to, when the device approval request is to add the slice server to the DDSN, initiate an approval process regarding the slice server;
a third section for storing a software routine that, when executing by the computer, causes the computer to, when the slice server is approved, update the device list to include the slice server, wherein the slice server is one of a set of slice servers that stores data slices of an encoded data segment, wherein "m" of "n" of the stored data slices are needed to reconstruct a data segment; and
a fourth section for storing a software routine that, when executing by the computer, causes the computer to determine that the device approval request is to update the slice server in the device list based on update of hardware characteristics of the slice server, wherein the hardware characteristics includes one or more of number of hard drives, amount of total storage, and amount of memory.

12. The storage device of claim 11, wherein the device approval request comprises:
a public key, a network address, and a hardware identifier.

13. The storage device of claim 11, wherein the first section further causes the processor to determine that the device approval request is to add the slice server by:
determining that there are no matches of a network address of the device approval request in the device list.

14. The storage device of claim 11, wherein the first section further causes the processor to determine whether the device approval request is to add the slice server by:
determining that there are no matches of a hardware identifier of the device approval request in the device list.

* * * * *